Jan. 9, 1951            G. VIGANÒ            2,537,248
FOLDABLE SPECTACLES
Filed March 12, 1947                                2 Sheets—Sheet 1
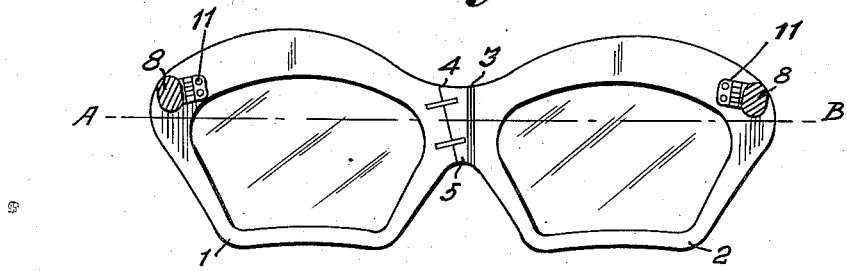
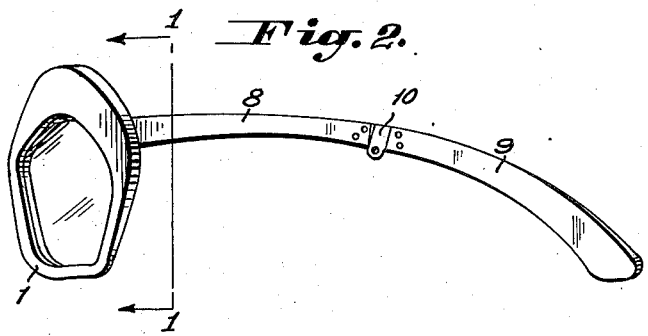
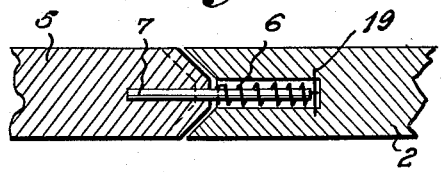
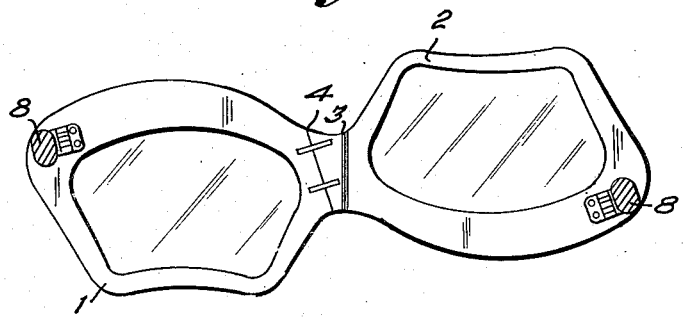
INVENTOR
G. Vigano
BY *Glencock Downing Reeble*
ATTORNEYS.

Jan. 9, 1951 G. VIGANÒ 2,537,248
FOLDABLE SPECTACLES
Filed March 12, 1947 2 Sheets-Sheet 2
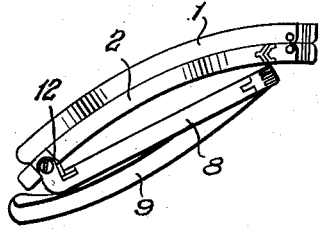
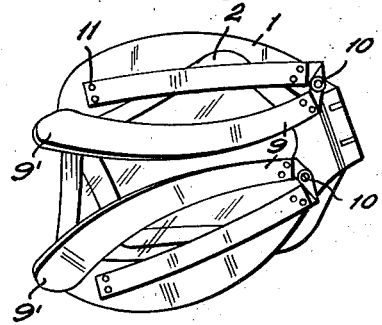
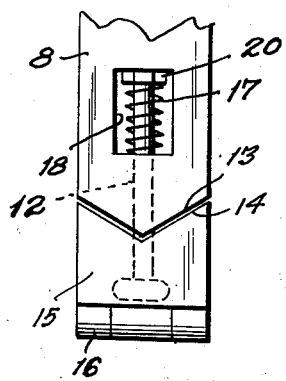
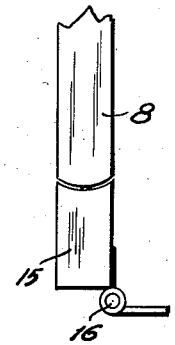
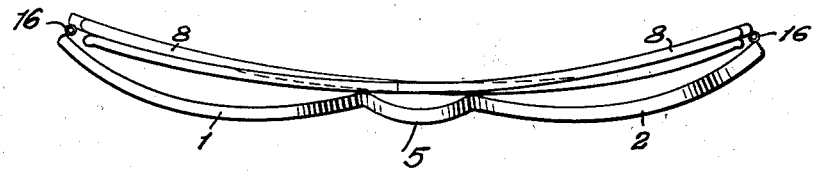
Inventor,
G. Vigano Patented Jan. 9, 1951

2,537,248

UNITED STATES PATENT OFFICE 2,537,248

FOLDABLE SPECTACLES

Gianni Viganò, Milan, Italy

Application March 12, 1947, Serial No. 734,162
In Italy October 2, 1945

Section 1, Public Law 690, August 8, 1946
Patent expires October 2, 1965

2 Claims. (Cl. 88—41)

This invention relates to a construction of eye glass frames and the connected shafts, which construction provides for the frames and shaft to be folded into compact relationship when the eye glasses are not in use.

An object of the invention is to provide a combination hinge and slidable joint arrangement between the two complementary halves of eye glass frames whereby the halves may be interfolded in nested relationship when not in use.

Another object of the invention is to provide a novel hinge structure medially of each of the shafts on the eye glass frames so that the shafts may be folded both on each other and on the nested halves of the frame when the eye glasses are not in use.

A further object of the invention is to provide a novel combination hinge and slidable joint arrangement between the shafts and the complementary halves of the eye glass frame whereby the convex shaft outline may be positioned within the concave outline of the frame when the eye glasses are not in use.

Still other objects, advantages and improvements will become apparent from the following specification taken in connection with the accompanying drawings, in which:

Figure 1 is a rear elevation view, partly in section along the line 1—1 of Figure 2, of the foldable eye glass frame according to the present invention;

Figure 2 is a side elevation view of one of the complementary halves of the eye glass frames showing the novel hinged construction of the shafts;

Figure 3 is a fragmentary sectional view through the bridge 5 of the eye glass frame, this view being taken along the line A—D of Figure 1, and showing in particular the slidable joint;

Figure 4 is a view similar to Figure 1, but showing one of the complementary halves of the frame rotated through 180 degrees with respect to the other;

Figure 5 is a side elevation view showing the complementary halves of the eye glass frame and the shafts all folded into compact relationship;

Figure 6 is a top plan view of the complementary halves of the eye glass frame and the shafts folded into compact relationship, as shown in Figure 5;

Figure 7 is a side elevation view showing the novel hinge and joint arrangement between the shafts and the complementary halves of the eye glass frames;

Figure 8 is an end elevation view of the hinge and joint arrangement shown in Figure 7; and Figure 9 is a top plan view showing the shafts folded with their convex outlines within the concave outlines of the two halves of the eye glass frame.

Referring now to the drawings in detail and to Figure 1 in particular, the complementary halves of the frame are designated at 1 and 2, these having suitable lenses therein. The shafts 8—8 are pivotally connected to the respective halves of the frame by hinges 11—11 in the usual manner. Between the complementary halves 1 and 2 of the eye glass frame there is the bridge 5. Across the bridge 5 there is a hinge 4 which connects the bridge to the half of the frame. Also across the bridge there is a joint 3 which separates the bridge from the frame half 2. As shown in Figure 3, this joint is comprised by double wedge on the bridge 5 and a complementary trough shaped notch in the edge of the frame half 2. A rod 7 is first fitted into a suitable hold medially of the thickness of the bridge 5 and freely extends into a suitable registering hole in the frame half 2. A coil spring 6 surrounds the rod 7 and at one end passes through a suitable diametrical hole in the latter and at the other end is secured to a pin 19 positioned diametrically of the hole in the frame half 2.

With the construction above described the complementary halves 1 and 2 of the frame may be pulled apart tensioning the coil spring 6 until the wedge surfaces on the bridge 5 are clear of the trough in the edge of the frame half 2. Then the frame half 2 can be rotated through 180 degrees with regard to the frame half 1, to the position shown in Figure 4, and the two frame halves allowed to snap together under the action of the coil spring 6. Either wedge surface on the frame half will then abut the opposite inclined wall in the trough in the edge of the frame half 2. From the position shown in Figure 4 the frame half 2 may be folded over whereby its convex face will nest within the concave face of the frame half 1 as shown in Figure 5.

As shown in Figure 2 each shaft is formed in two halves connected by a hinge 10, which hinge is positioned at right angles to the hinge 11 connecting the shaft section 8 to the frame half 1. Each stem half 8 or 9 is folded with the concave edge section of the two halves facing each other and with the concave side section also facing each other and the concave surfaces of the nested frame halves 1—2. This final folded position of the parts is preferable for reduction of total volume of the glasses.

It is noted that the end 9' of each half stem section 9 is slightly curved with respect to the main body thereof to better adapt the glasses to the head of the wearer.

According to the arrangement shown in Figures 7, 8 and 9, the shafts 8 are secured to the frame halves by the combined hinge and slidable joint as shown on the bridge 5 in Figure 1. A block 15 is pivotally attached to each frame half 1 and 2 by a hinge 10. The block 15 has a trough shaped edge 14, similar to the edge on the frame half 2, and the shaft 8 has a complementary double wedge thereon, similar to the double wedge on the bridge 5 of Figure 3. A pin 12 is force fitted in a suitable hole positioned at the mid-thickness of the block 15 and extends into an elongated slot to the shaft 8. A coil spring 17 is positioned in the slot 18 surrounding the pin 12 and at one end abuts a nut or collar 20 on the pin and at the other end abuts a nut or collar 20 on the pin.

With the above described construction each shaft 8 may be pulled outwardly against the force of the coil spring 17, from the frame half 1 or 2 until the double wedge surfaces on the shaft are clear of the trough shaped edge on the block 15, the shaft rotated through 180° and allowed to again move into abutting engagement with the block 15, each wedge surface on the stem 8 then abutting the opposite face of the trough shaped edge on the block 15. The shafts 8 may be then swung through the hinges 16 to the position shown in Figure 9 wherein the convex sides of the shafts rest within the convex outlines of the frame 1—2.

Having now described my invention what I claim as new and useful and desire to secure by Letters Patent of the United States is:

1. In a mount for folding spectacles, the combination with a pair of lens frames, a bridge element intermediate said lens frames, a hinge intermediate and connecting one lens frame to the bridge element and pivoting along an approximately vertical axis, said bridge element being formed with a double bevel on the edge opposite the hinge, said second lens frame having a complementary bevelled surface along the edge abutting the bridge elements, a pin disposed in the bridge element along a horizontal and approximately central axis disposed in the general plane of the lens frames and extending from the apex of the bevel on the bridge element and having an enlarged head, said second lens frame having a bore extending inwardly from the apex of the double bevelled edge disposed along the horizontal and approximately central axis of the lens frames and receiving the pin and its enlarged head and a spring surrounding said pin and secured at one end to the bridge element and at the other to the enlarged head of the pin, said spring permitting limited slidable movement of the second lens frame along the pin with respect to the first to free its complementary bevelled edges and provide for rotation of the second lens frame with respect to the first lens frame and bridge element.

2. In a mount for folding spectacles, the combination with a pair of lens frames, a bridge element intermediate said lens frames, a hinge intermediate and connecting one lens frame to the bridge element and pivoting along an approximately vertical axis, said bridge element being formed with a double bevel on the edge opposite the hinge, said second lens frame having a complementary double bevelled surface along the edge abutting the bridge element, a pin disposed on the bridge element along a horizontal and approximately central axis and in the general plane of the lens frames and extending from the apex of the bevel on the bridge element and having an enlarged head, said second lens frames having a bore extending inwardly from the apex of the double bevelled edge disposed along the horizontal and approximately central axis of the lens frames and receiving the pin and the enlarged head of the pin, said spring limiting relative slidable movement of the second lens frame along the pin, and holding the second lens frame in contact with the bridge element in the operative position and also in a second position displaced 180° therefrom, a pair of stems each formed in two parts, hinges securing the stems to the outer upper ends of the lens frames, additional hinges in the stems at approximately their mid-sections, and means incorporated in said latter hinges for holding both parts of said stem aligned in the operative position, the free ends of said stem being contoured to suit the wearer's head shape.

GIANNI VIGANÒ.

REFERENCES CITED

The following references are of record in the file of this patent:

UNITED STATES PATENTS

| Number | Name | Date |
| --- | --- | --- |
| 807,844 | Mirovitch | Dec. 19, 1905 |
| 2,065,122 | Diggins | Dec. 22, 1936 |
| 2,275,999 | Strauss | Mar. 10, 1944 |